US012586322B2

(12) United States Patent
   Ha

(10) Patent No.: US 12,586,322 B2
(45) Date of Patent: Mar. 24, 2026

(54) OPTICAL DEVICE FOR AUGMENTED REALITY HAVING GHOST IMAGE PREVENTION FUNCTION

(71) Applicant: LETINAR CO., LTD, Anyang-si (KR)

(72) Inventor: Jeong Hun Ha, Seoul (KR)

(73) Assignee: LETINAR CO., LTD, Anyang-si (KR)

( * ) Notice: Subject to any disclaimer, the term of this patent is extended or adjusted under 35 U.S.C. 154(b) by 378 days.

(21) Appl. No.: 18/460,916

(22) Filed: Sep. 5, 2023

(65) Prior Publication Data

US 2024/0177432 A1     May 30, 2024

(30) Foreign Application Priority Data

Nov. 24, 2022     (KR) ........................ 10-2022-0158818

(51) Int. Cl.
   *G06T 19/00*       (2011.01)
   *G02B 27/01*       (2006.01)
   *H04N 13/32*       (2018.01)
   *H04N 13/322*      (2018.01)

(52) U.S. Cl.
   CPC ........... *G06T 19/006* (2013.01); *H04N 13/32* (2018.05); *H04N 13/322* (2018.05); *G02B 2027/0178* (2013.01)

(58) Field of Classification Search
   CPC ... G02F 1/0311; G02F 1/0063; G02B 26/002; G02B 27/42; G02B 27/0018; G02B 27/0172; G02B 27/0178; G06T 19/006
   See application file for complete search history.

(56) References Cited

U.S. PATENT DOCUMENTS 12,442,967 B2 * 10/2025 Bhakta ..................... G02B 6/34

FOREIGN PATENT DOCUMENTS

| CN | 117706769 A | * | 3/2024 | .............. G02B 5/18 |
| KR | 1020180027813 A | | 3/2018 | |
| KR | 1020220049744 A | | 4/2022 | |

* cited by examiner

*Primary Examiner* — Chante E Harrison
(74) *Attorney, Agent, or Firm* — Rabin & Berdo, P.C.

(57)     ABSTRACT

Provided is an optical device for augmented reality having a ghost image prevention function. The optical device includes: an image output unit to output virtual image light; an optical unit configured such that the virtual image light propagates through an inside thereof and real object image light is transmitted therethrough toward a pupil; a first optical element inside the optical unit to transfer the virtual image light to a plurality of second optical elements; and the second optical elements disposed inside the optical unit, and configured to provide a virtual image to the user by transferring the virtual image light toward the user's pupil. The optical unit has a first, a second, and a third surfaces. The third surface has an inclination angle to a normal line in a forward direction from the user's pupil and the image output unit is spaced apart from the third surface.

13 Claims, 9 Drawing Sheets

GHOST IMAGE     NORMAL IMAGE     GHOST IMAGE
CAUSED BY GL1     CAUSED BY NL     CAUSED BY GL2

OPTICAL DEVICE FOR AUGMENTED REALITY HAVING GHOST IMAGE PREVENTION FUNCTION

CROSS-REFERENCE TO RELATED APPLICATION

This application claims the benefit of Korean Patent Application No. 10-2022-0158818 filed on Nov. 24, 2022, which is hereby incorporated by reference herein in its entirety.

BACKGROUND

1. Technical Field

The present invention relates to an optical device for augmented reality, and more particularly, to an optical device for augmented reality capable of preventing ghost images by adjusting the distance and inclination angle between an image output unit and an optical means.

2. Description of the Related Art

Augmented reality (AR) refers to technology that super-imposes a virtual image, provided by a computer or the like, on a real image of the real world and then provides a resulting image, thereby providing "augmented" virtual image information to a user, as is well known.

In order to realize such augmented reality, there is required an optical combiner that enables the simultaneous observation of virtual images and real images of the real world. As such optical combiners, there are known half mirror-type combiners and holographic/diffractive optical element (HOE/DOE)-type combiners.

Meanwhile, the present applicant developed such a optical combiners using an optical element in the form of a pin mirror having a smaller size than the average pupil of people (see Korean Patent Application Publication No. 10-2018-0027813 (hereinafter referred to as "related art document 1") published on Mar. 15, 2018).

According to this technology, by disposing a small reflective unit having a smaller size than the average size of the pupil of people, e.g., 4 mm or less, inside an optical means such as a lens, the Depth of Field (DoF) for light entering the pupil through the reflective unit may be made almost infinite, i.e., considerably deep.

The Depth of Field (DoF) refers to a range within which an image for augmented reality is recognized as being in focus. As the depth of field increases, the range of focal lengths for virtual images widens correspondingly. Accordingly, even when a user changes the focal length for the real world while gazing at the real world, the user always recognizes an image for augmented reality as being in focus regardless of such a change. This may be viewed as a type of pinhole effect. Accordingly, even when the user changes the focal length while gazing at a real object present in the real world, the user may always view a clear virtual image for an image for augmented reality.

Based on the technology disclosed in related art document 1, the present applicant developed a technology capable of expanding the field of view (FoV) and eyebox thereof and reducing the size and weight of a device by disposing a plurality of small reflective units and disposing an optical conversion unit inside an optical means (see Korean Patent Application Publication No. 10-2022-0049744 (hereinafter referred to as "related art document 2") published on Apr. 22, 2022).

FIG. 1 is a side view showing the configuration of an optical device 100 for augmented reality disclosed in related art document 2.

Referring to FIG. 1, the optical device 100 for augmented reality includes an image output unit 10, an optical means 20, a first optical element 30, and a plurality of second optical elements 40.

The image output unit 10 is a means for outputting virtual image light, which corresponds to a virtual image. For example, the image output unit 10 may be formed of a display unit such as a small-sized LCD, OLED, LCoS, or micro LED display unit.

The optical means 20 serves to transmit the real object image light, output from a real object in the real world, therethrough to the pupil 50 and to output the virtual image light, transferred from the second optical elements 40, to the pupil 50. The first optical element 30 serves to transfer the virtual image light, output from the image output unit 10, to the second optical elements 40. Furthermore, the first optical element 30 serves as an optical conversion unit such as a mirror that reflects virtual image light so that the virtual image light is output based on an intended optical path and focal length or a collimator that converts incident light into parallel light and outputs the parallel light.

The second optical elements 40 are means for transferring the virtual image light, transferred from the first optical element 30, toward the pupil 50 of a user.

The second optical elements 40 may be reflective means such as full mirrors, and are each formed to have a smaller size than the average pupil size of people, e.g., 4 mm or less, to provide a pinhole effect as described above.

The second optical elements 40 may be formed of a plurality of reflective modules arranged in an array form.

The optical device 100 for augmented reality has the advantages of being able to widen the FOV and eyebox thereof and being advantageous in terms of the small size and light weight of the device. However, the optical device 100 for augmented reality has a problem in that unintended ghost images may be generated because the first optical element 30 is disposed inside the optical means 10.

SUMMARY

The present invention has been conceived to overcome the above-described problems, and an object of the present invention is to provide an optical device for augmented reality capable of preventing ghost images by adjusting the distance and inclination angle between an image output unit and an optical means.

According to an aspect of the present invention, there is provided an optical device for augmented reality having a ghost image prevention function, the optical device including: an image output unit configured to output virtual image light; an optical means configured such that the virtual image light output from the image output unit propagates through an inside thereof and object real image light is transmitted therethrough toward a pupil of an eye of a user; a first optical element disposed inside the optical means, and configured to transfer the virtual image light, output and transferred from the image output unit, to a plurality of second optical elements; and the plurality of second optical elements disposed inside the optical means, and configured to provide a virtual image to the user by transferring the virtual image light, transferred from the first optical element, toward the pupil of the eye of the user; wherein the optical means has a first surface through which the virtual image light and the real object image light are output toward the pupil of the user, a second surface which is opposite to the first surface and on which the real object image light is incident, and a third surface on which the virtual image light output from the image output unit is incident; wherein the third surface is formed to have an inclination angle $\theta_{in}$ with respect to the normal line in the forward direction from the pupil; wherein the third surface is disposed to face the surface of the image output unit; and wherein the image output unit is disposed spaced apart from the third surface so that the distance $L_g$ between the image output unit and the third surface satisfies the following equation:

$$L_g \geq \frac{L_d}{2}\sqrt{\frac{1 - n^2\sin^2\theta_{in}}{n^2\sin^2\theta_{in}}}$$

where $L_d$ is the length of the image output unit, $\theta_{in}$ is the inclination angle between the third surface of the optical means and the normal line in the forward direction from the pupil, and n is the refractive index of the optical means.

The inclination angle $\theta_{in}$ between the third surface of the optical means and the normal line in the forward direction from the pupil may have a value in the range of 30° to 60°.

The third surface of the optical means and the surface of the image output unit may be disposed parallel to each other.

The virtual image light output from the image output unit may be reflected by total internal reflection on the second surface of the optical means and then transferred to the first optical element, and the virtual image light output from the first optical element may be reflected again by total internal reflection on the second surface of the optical means and then transferred to the second optical elements.

The first optical element may be any one of a reflective means configured to reflect the incident virtual image light and a half mirror configured to transmit part of the incident virtual image light therethrough and reflect part of the incident virtual image light.

The first optical element may be embedded inside the optical means so that the reflective surface of the first optical element faces the second surface of the optical means.

The reflective surface may be a curved surface that is formed concave with respect to the direction of the second surface of the optical means.

The plurality of second optical elements may be arranged such that the centers of the plurality of second optical elements are located along a straight line perpendicular to the normal line in the forward direction from the pupil when viewed from a side.

The plurality of second optical elements may be arranged spaced apart from each other to appear like a two-dimensional array when viewed from the front.

The plurality of second optical elements may be arranged inclined inside the optical means to transfer the virtual image light, transferred from the first optical element, to the pupil.

Each of the plurality of second optical elements may be any one of a reflective means configured to reflect the incident virtual image light and a half mirror configured to transmit part of the incident virtual image light therethrough and reflect part of the incident virtual image light.

The plurality of second optical elements may each be formed of any one of a refractive element, a diffractive element, and a holographic optical element, or a combination thereof.

The plurality of second optical elements may have a size in the range of 0.3 to 4 mm.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings.

Figure 2:
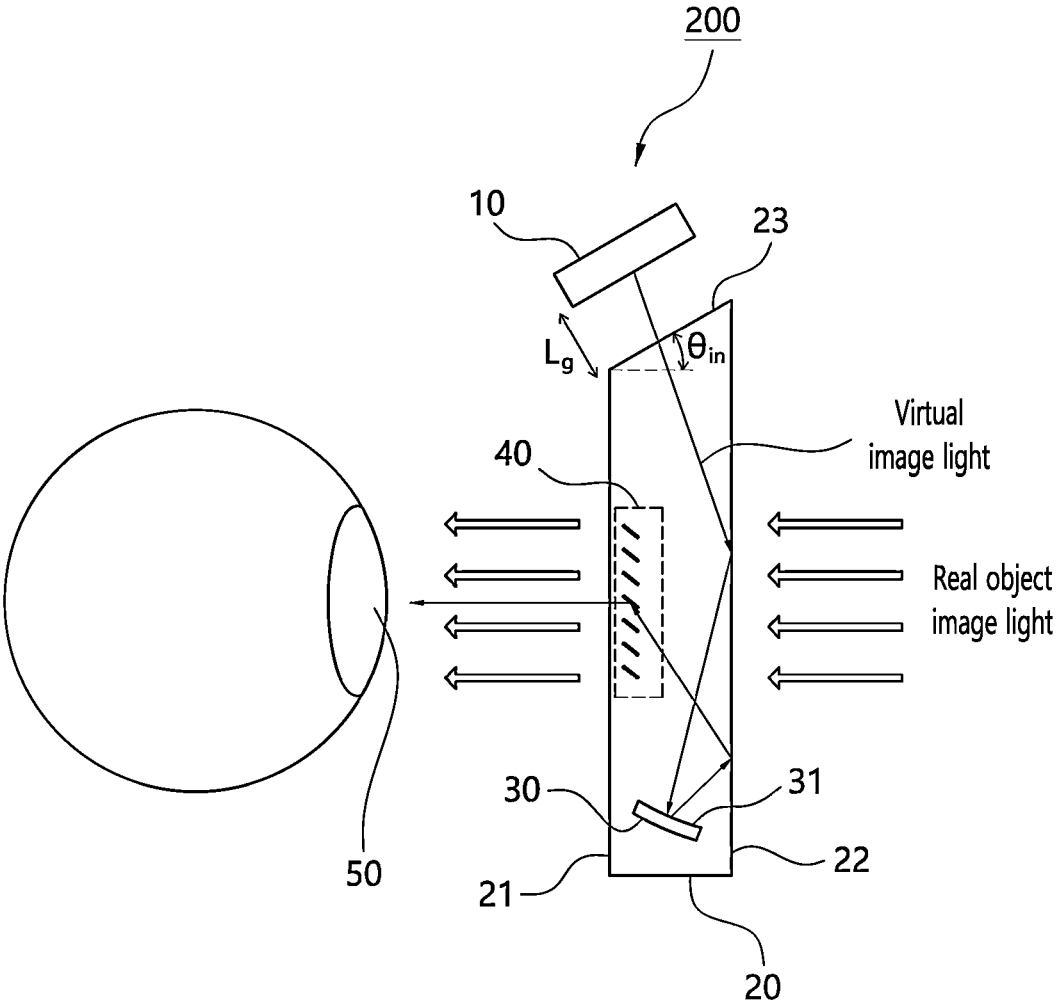
FIGS. 2 to 4 show side, perspective, and front views of an optical device for augmented reality having a ghost image prevention function according to the present invention, respectively.
Figure 3:
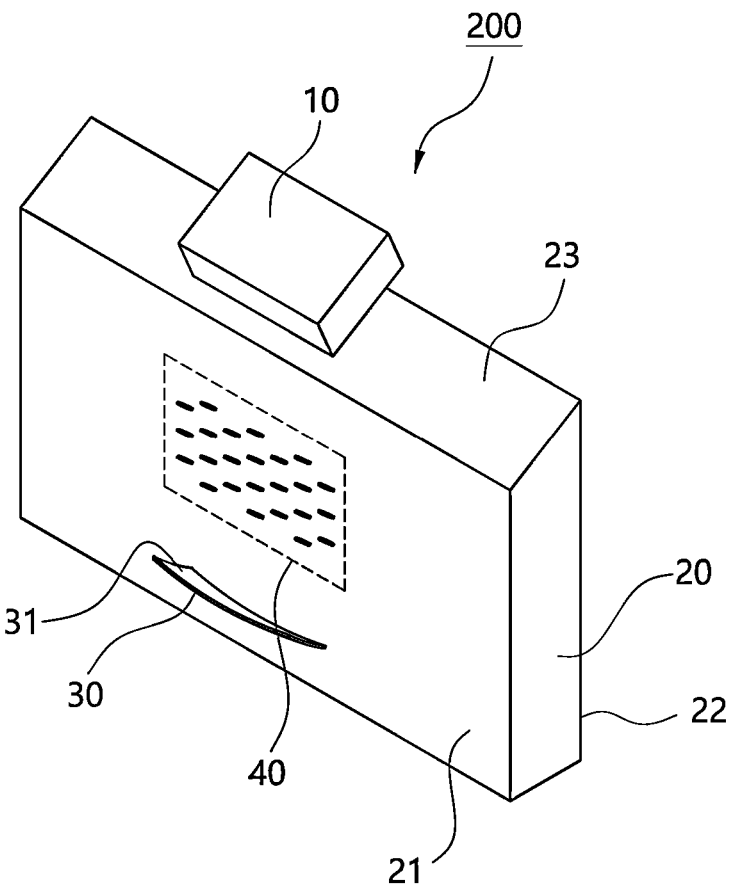
Figure 4:
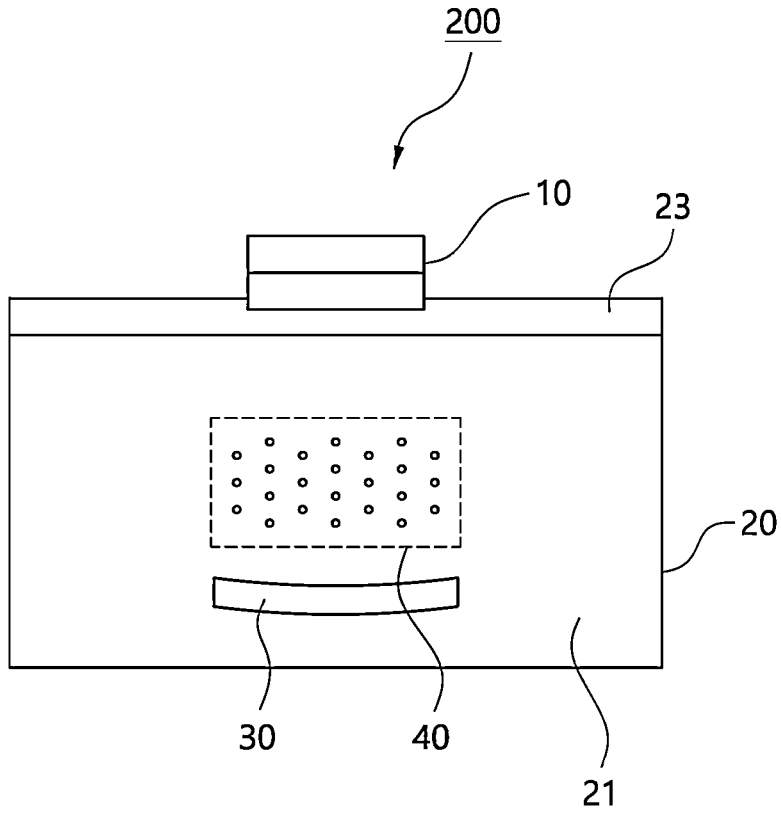

FIGS. 2 to 4 show side, perspective, and front views of an optical device 200 for augmented reality having a ghost image prevention function (hereinafter simply referred to as the "optical device 200") according to the present invention, respectively.

Referring to FIGS. 2 to 4, the optical device 200 includes an image output unit 10, an optical means 20, a first optical element 30, and a plurality of second optical elements 40.

The image output unit 10 is a means for outputting virtual image light which is image light corresponding to a virtual image. In this case, the term "virtual image" refers to an image for augmented reality provided to a user, and may be a still image or a moving image.

The image output unit 10 may be implemented as a conventionally known display unit such as a small-sized LCD, OLED, LCoS, or micro LED display unit. Furthermore, the image output unit 10 may further include an optical element composed of a combination of one or more of a reflective means, a refractive means, and a diffractive means which is coupled to the display unit.

Since the image output unit 10 itself is not the direct purpose of the present invention and is known in the prior art, a detailed description thereof will be omitted.

However, in the present invention, the image output unit 10 is characterized in that it is disposed spaced apart from the third surface 23 of the optical means 20 as will be described later.

The optical means 20 is a means for transferring the real object image light, output from a real object present in the real world, toward the pupil 40 of an eye of a user by transmitting the real object image light therethrough. Furthermore, the virtual image light output from the image output unit 10 propagates through inside of the optical means 20. Thus, the optical means 20 serves as a waveguide for the virtual image light output from the image output unit 10 propagates.

The first and second optical elements 30 and 40 are embedded in the optical means 20.

The optical means 20 may be made of a transparent resin or glass material.

The optical means 20 has a first surface 21 through which virtual image light and real object image light are output toward the pupil 50 of the user, a second surface 12 which is opposite to the first surface 21 and on which the real object image light is incident, and a third surface 23 on which the virtual image light output from the image output unit 10 is incident.

In the present invention, the third surface 23 of the optical means 20 is formed to have an inclination angle $\theta_{in}$ with respect to the normal line in the forward direction from the pupil 50 when the optical device 200 is placed in front of the pupil 50, as shown in FIG. 4. In this case, the inclination angle $\theta_{in}$ may have a value in the range of 0° to 90° and more preferably has a value in the range of about 30° to 60°.

Furthermore, the third surface 23 of the optical means 20 is disposed to face the surface of the image output unit 10, and the image output unit 10 is disposed spaced apart from the third surface 23 by a distance $L_g$. In this case, the surface of the image output unit 10 refers the surface of the image output unit 10 through which virtual image light is output.

In addition, the third surface 23 of the optical means 20 and the surface of the image output unit 10 are preferably disposed parallel to each other. However, it is obvious that they do not need to be parallel and may be disposed to have a slight inclination angle with respect to each other.

When either or both of the third surface 23 of the optical means 20 and the surface of the image output unit 10 are not flat, it is preferable to dispose the surfaces so that a straight line in the forward direction from the center of the surface of the image output unit 10 and a straight line in the forward direction from the center of the third surface 23 of the optical unit 20 are parallel to each other.

The first optical element 30 is embedded in the optical means 20 and serves to transfer the virtual image light, output from the image output unit 10, to the second optical elements 40.

In the embodiment of FIGS. 2 to 4, the virtual image light output from the image output unit 10 is reflected by total internal reflection on the second surface 22 of the optical means 20 and then transferred to the first optical element 30. Then, the virtual image light output from the first optical element 30 is reflected again by total internal reflection on the second surface 22 of the optical means 20 and transferred to the second optical elements 40.

Accordingly, the first optical element 30 is disposed at an appropriate inclination angle inside the optical means 20 according to the relative positions of the image output unit 10 and the second optical elements 40 based on the above-described light path.

However, this is merely an example, and the virtual image light output from the image output unit 10 may be transferred to the first optical element 30 by total internal reflection on the first surface 21 of the optical means 20. In this case, the first optical element 30 is disposed at an appropriate inclination angle inside the optical means 20 based on this light path.

Meanwhile, the focal length of the virtual image light output from the first optical element 30 is pre-determined and the first optical element 30 serves as an optical conversion unit that converts the light path of incident virtual image light to meet the pre-determined focal length and other design requirements and outputs the virtual image light.

For example, the first optical element 30 may be a reflective means for reflecting incident virtual image light. For example, the first optical element 30 may be a concave mirror that outputs virtual image light by reflection so that a virtual image can be magnified and then transferred to the pupil 50.

In this case, the first optical element 30 is preferably, e.g., a full mirror made of metal that has a reflectance of 100% or a high reflectance value close to 100%. However, the first optical element 30 may be a half mirror that transmits part of incident light and reflects part of the incident light.

When the first optical element 30 is a reflective means, the first optical element 30 may be embedded in the optical means 20 so that the reflective surface 31 that reflects off virtual image light faces the second surface 22 of the optical means 20, as shown in the drawing. In this case, the normal line from the center of the reflective surface 31 and the second surface 22 of the optical means 20 may be inclined so that they are not parallel to each other.

Meanwhile, the reflective surface 31 of the first optical element 30 may be formed as a curved surface. For example, the reflective surface 31 of the first optical element 30 may be formed to be concave with respect to the direction of the second surface 22 of the optical means 20, as shown in the drawing.

Meanwhile, the first optical element 30 may be implemented to provide the function of a collimator that converts incident virtual image light into parallel light and outputs the collimated parallel light.

Furthermore, the first optical element 30 may be formed of a refractive element or a diffractive element other than a reflective means. Alternatively, the first optical element 30 may be formed of a combination of at least two or more of a reflective means, a refractive element, and a diffractive element.

Furthermore, the first optical element 30 may be formed of an optical element such as a notch filter that selectively transmits light therethrough depending on the wavelength thereof.

Meanwhile, as shown in FIGS. 3 and 4, the first optical element 30 may be formed in a generally spread "U" bar shape with a concave central portion.

The plurality of second optical elements 40 are embedded in the optical means 2, and are means for providing a virtual image to a user by transferring the virtual image light, transferred from the first optical element 30, to the pupil 50 of an eye of the user.

As shown in FIG. 4, the plurality of second optical elements 40 may be arranged spaced apart from each other to appear like a two-dimensional array when the optical device 200 is placed in front of the pupil 50 and then viewed.

All the intervals between the second optical elements 40 may be the same, however, it is obvious that at least some of the intervals may be different.

Furthermore, as shown in FIG. 2, the plurality of second optical elements 40 may be arranged such that each center of the plurality of second optical elements 40 are positioned on a straight line when the optical device 200 is viewed from a side. In this case, the straight line may be perpendicular to the normal line in the forward direction from the pupil 50.

Each of the second optical elements 40 may be disposed inclined inside the optical means 20 to transfer the virtual image light, transferred from the first optical element 30, to the pupil 50. In this case, each of the second optical elements 40 are each disposed inside the optical means 20 at an appropriate inclination angle by taking into consideration the relative positions of the image output unit 10, the first optical element 30, and the pupil 50.

In the embodiment of FIGS. 2 to 4, as described above, the virtual image light output from the first optical element 30 is reflected by total internal reflection on the second surface 22 of the optical means 20 and then transferred to the plurality of second optical elements 40. Accordingly, the plurality of second optical elements 40 are each disposed inside the optical means 20 at an inclination angle by taking into consideration the above-described light path.

Meanwhile, the plurality of second optical elements 40 may be formed to have a height of, i.e., 8 mm or less, preferably 4 mm or less, that is smaller than the size of the average pupil of people when viewed from the front, as shown in FIG. 4.

By this, the depth of field for light entering the pupil 40 may be made considerably deep. Accordingly, there may be achieved a pinhole effect in which even when a user changes the focal length for the real world while gazing at the real world, the user always recognizes a virtual image as being in focus regardless of such a change.

However, since a diffraction phenomenon increases when the height is excessively small, it is preferable that the height has a size larger than an appropriate size. For example, it is preferable to make the second optical element 40 larger than 0.3 mm.

Further, each of the plurality of second optical elements 40 is preferably a reflective means which reflects off incident virtual image light. In this case, each of the second optical elements 40 is preferably a full mirror made of metal that has a reflectance of 100% or a high reflectance value close to 100%. However, the second optical element 40 may be a half mirror that transmits part of incident light and reflects part of the incident light.

Furthermore, each of the plurality of second optical elements 40 may be formed of any one of a refractive element, a diffractive element, and a holographic optical element, or a combination thereof.

Next, the principle of minimizing ghost images according to the present invention will be described with reference to FIG. 5 and below.

Figure 5:
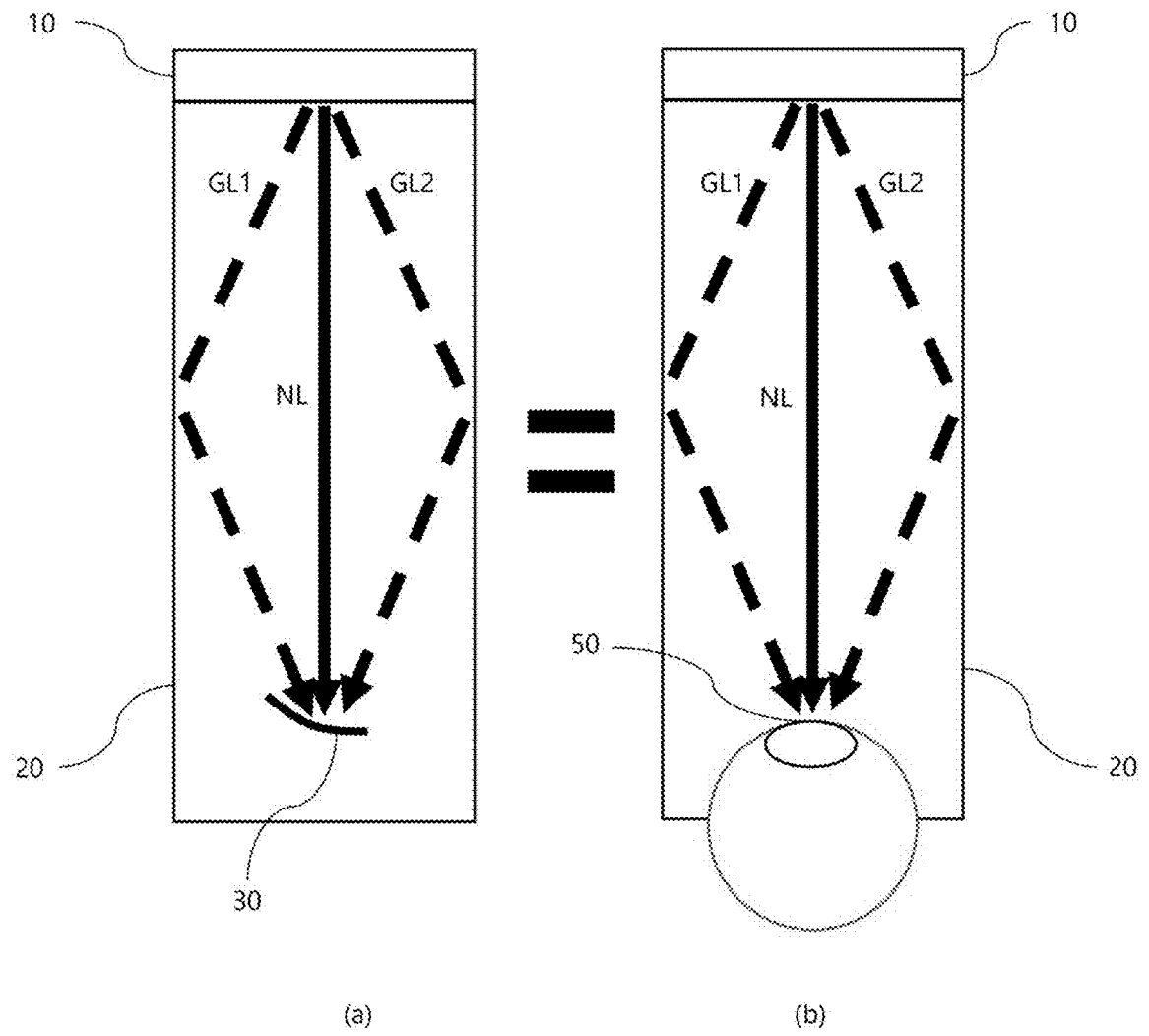
FIGS. 5 and 6 are diagrams illustrating the principle by which ghost images are generated.
Figure 6:
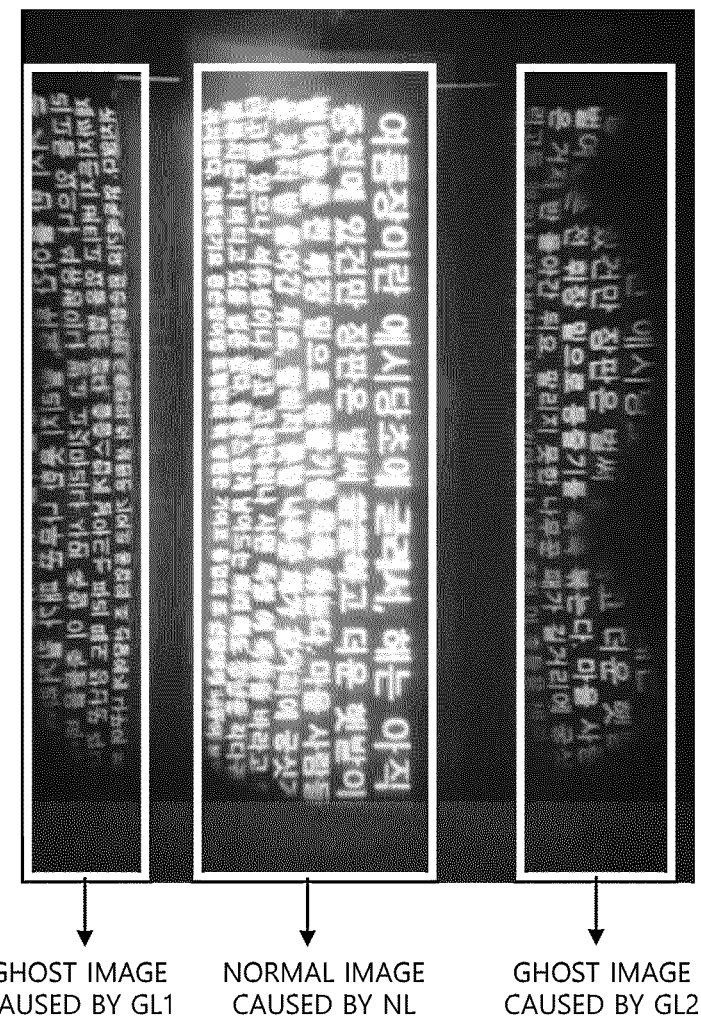

FIGS. 5 and 6 are diagrams illustrating the principle by which ghost images are generated.

Figure 1:
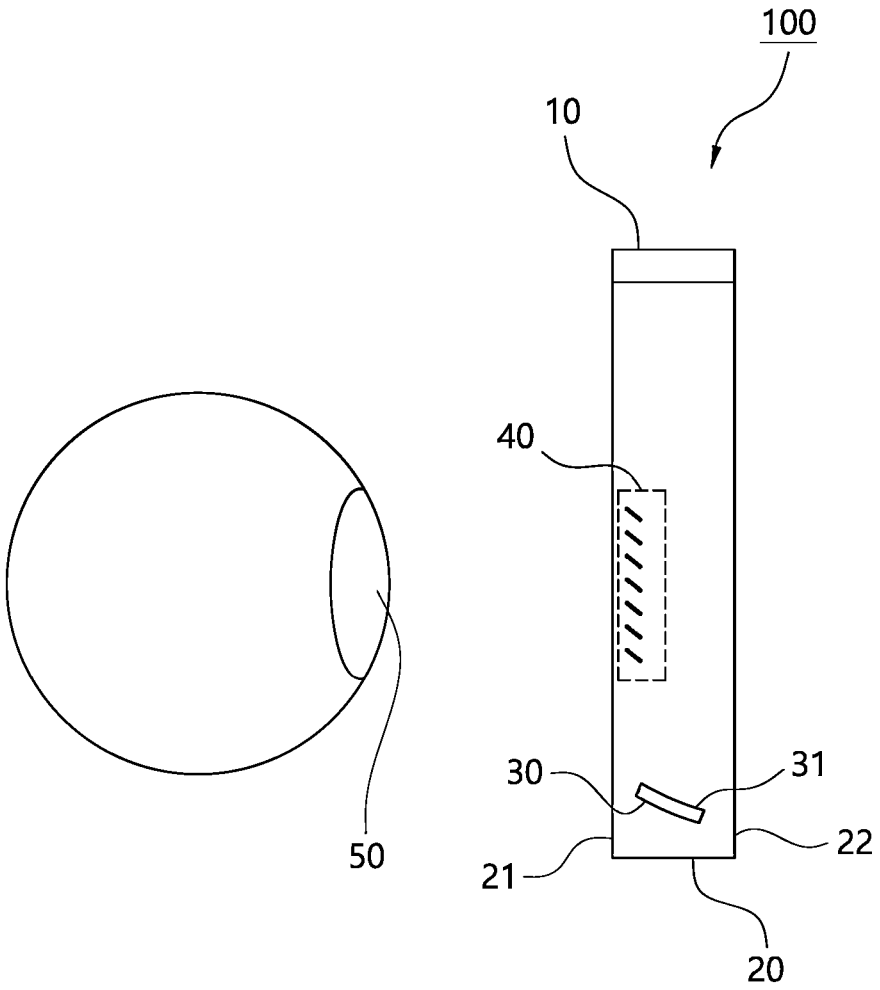
FIG. 1 is a side view showing the configuration of an optical device for augmented reality disclosed in related art document 2.

FIG. 5 shows the conventional optical device 100 for augmented reality as shown in FIG. 1 and the second optical elements 40 are omitted for convenience of description in FIG. 5.

As described above, the first optical element 30 appropriately converts the virtual image light, output from the image output unit 10, to meet design requirements and then transfers the converted virtual image light to the second optical elements 40. Then, the second optical elements 40 transfer the virtual image light to the pupil 50. Accordingly, the ghost images observed in the pupil 50 result from the ghost images observed in the first optical element 30.

Accordingly, when the ghost images observed in the first optical device 30 can be minimized, the ghost images transferred to the pupil 50 can also be minimized.

FIG. 5(a) shows light paths in the conventional optical device 100 for augmented reality and FIG. 5(b) shows light paths in a state where the pupil 50 is placed at the location of the first optical element 30. These drawings show a normal light NL and astray lights GL1 and GL2 generating ghost images that are observed in the first optical element 30 or the pupil 50.

As shown in FIG. 5, the virtual image light output from one point of the image output unit 10 is reflected by total internal reflection inside the optical means 20 or enters the first optical element 30 without total internal reflection. Since the inner surfaces of the optical means 20 on which the virtual image light is reflected by total internal reflection, i.e., the first surface 21 and the second surface 22, each act as a kind of mirror, the astray lights GL1 and GL2 may result in unintended ghost images, as shown in FIG. 5.

FIG. 6 shows actual examples of ghost images.

Referring to FIG. 6, it can be seen that ghost images are observed in the first optical device 30 due to the astray lights GL1 and GL2, as shown in FIG. 5.

Figure 7:
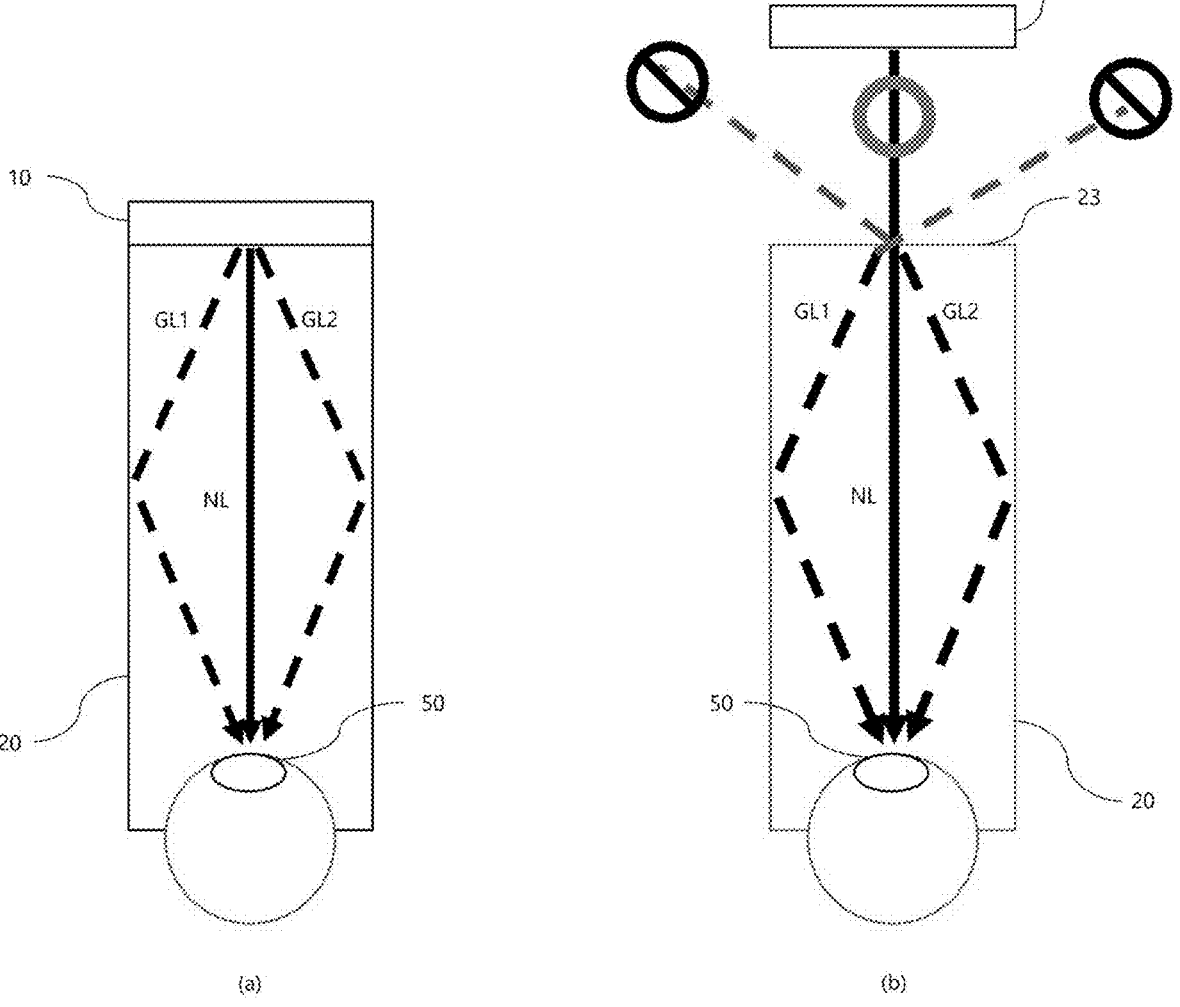
FIG. 7 is a diagram illustrating the principle of minimizing ghost images by adjusting the distance between an image output unit and an optical unit.

FIG. 7 is a diagram illustrating the principle of minimizing ghost images by adjusting the distance between the image output unit 10 and the optical means 20.

The case of FIG. 7(a) is the same as that of FIG. 5 described above. In this case, ghost images may be observed at the position of the first optical element 30 replaced with the pupil 50 due to the astray lights GL1 and GL2 as described above.

FIG. 7(b) shows a state in which the image output unit 10 is spaced apart from the third surface 23 of the optical means 20. In this case, it can be seen that the astray lights GL1 and GL2 generating ghost images may not be transferred to the first optical element 30. Accordingly, the ghost images caused by the astray lights GL1 and GL2 as described with reference to FIGS. 5 and 6 may be prevented.

Figure 8:
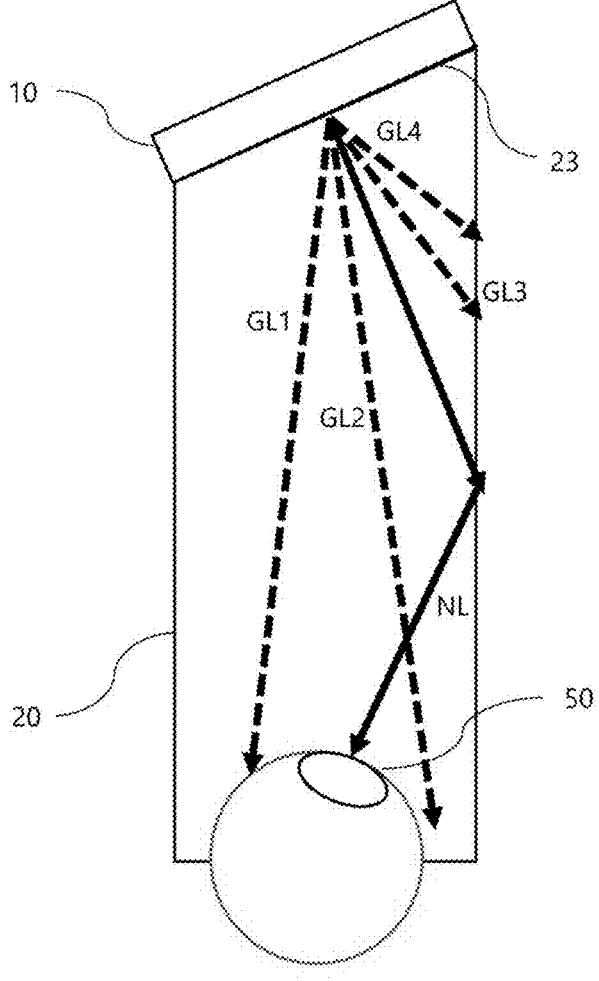
FIG. 8 is a diagram illustrating the principle of minimizing ghost images by adjusting the incident angle at which virtual image light is incident onto an optical means.

FIG. 8 is a diagram illustrating the principle of minimizing ghost images by adjusting the incident angle at which virtual image light is incident onto the optical means 20.

The optical device for augmented reality shown in FIG. 8 is different from the conventional optical device 100 for augmented reality shown in FIGS. 5 to 7 in that the surface of the image output unit 10 is disposed to have an inclination angle with respect to the normal line in the forward direction from the pupil 50 rather than being parallel to the normal line.

Furthermore, while the third surface 23 of the optical means 20 is formed to be parallel to the surface of the image output unit 10, and is disposed not to be parallel to the normal line from the pupil 50, i.e. a straight line in the forward direction from the pupil 50, but to have an inclination angle with respect to the normal line.

In the case of FIG. 8, the divergence angle of the virtual image light output from one point of the image output unit 10 is changed due to total internal reflection inside the optical means 20, so that it can be seen that a normal light NL is transferred to the first optical element 30 replaced with the pupil 50, but astray lights GL1, GL2, GL3, and GL4 that generate ghost images cannot be transferred to the first optical element 30.

According to the principles described with reference to FIGS. 5 to 8, it can be seen that when the image output unit 10 is disposed spaced apart from the optical means 20 and the incident angle of the virtual image light incident onto the optical means 20 is adjusted, ghost images may be reduced in the optical device 200 of the invention.

Figure 9:
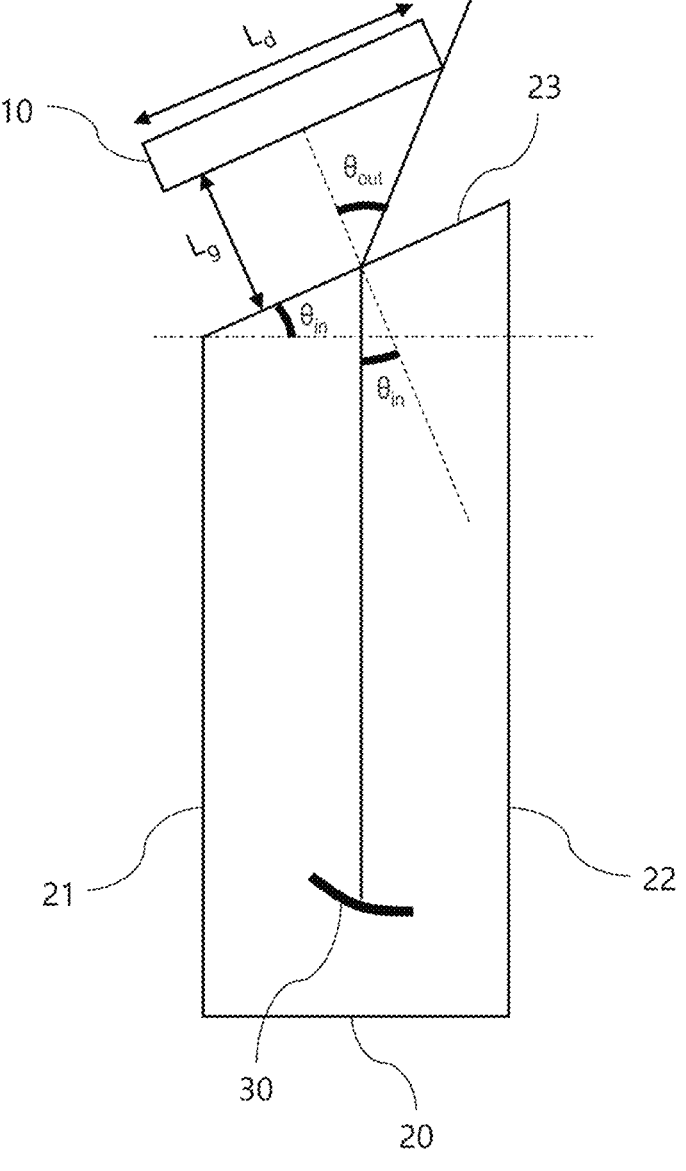
FIG. 9 is a diagram illustrating the principles of the distance between an image output unit and an optical unit and the inclination angle of the image output unit in the optical device according to the present invention.

FIG. 9 is a diagram illustrating the principles of the distance $L_g$ between the image output unit 10 and the optical means 20 and the inclination angle of the image output unit 10 in the optical device 200 according to the present invention.

As shown in FIG. 9, $L_g$ is the distance between the third surface 23 of the optical means 20 and the image output unit 10. Furthermore, $L_d$ denotes the length of the image output unit 10, or more specifically, the length of the image output unit 10 when the optical device 200 is viewed from a side, as shown in FIG. 2.

Furthermore, $\theta_{in}$ is the inclination angle between the third surface 23 of the optical means 20 and the normal line in the forward direction from the pupil 50.

Furthermore, $\theta_{out}$ is an inclination angle that is formed by a normal line from any one point of the third surface 23 of the optical means 20 and a straight line from the any one point to an end of the image output unit 10. In this case, the any one point may be the center of the third surface 23 of the optical means 20.

When the refractive index of the optical means 20 is n, the following relationship is established according to Snell's law:

$$n = \frac{\sin\theta_{out}}{\sin\theta_{in}}$$

In addition, the following relationship is established according to the triangle proportionality theorem:

$$\tan\theta_{out} = \frac{L_d}{2L_g}$$

Accordingly, it can be seen that $$L_g = \frac{L_d}{2\tan\theta_{out}}$$

is established.

In this state, based on the principle described above with reference to FIGS. 5 to 8, when $L_g$ is made larger than the above value, ghost images may be minimized.

That is, in the case of $$L_g \ge \frac{L_d}{2\tan\theta_{out}},$$

ghost images may be minimized.

In this case, $$\tan\theta_{out} = \frac{\sin\theta_{out}}{\cos\theta_{out}} = \sqrt{\frac{\sin^2\theta_{out}}{1 - \sin^2\theta_{out}}} \text{ and } n = \frac{\sin\theta_{out}}{\sin\theta_{in}},$$

so that when $\theta_{out}$ is expressed as $\theta_{in}$ and the equation is arranged, the distance $L_g$ between the image output unit 10 and the third surface 23 of the optical means 20 for minimizing ghost images may be represented by the following equation:

$$L_g \ge \frac{L_d}{2}\sqrt{\frac{1 - n^2\sin^2\theta_{in}}{n^2\sin^2\theta_{in}}}$$

In other words, when the image output unit 10 is disposed spaced apart from the third surface 23 of the optical means 20 by a distance in order to satisfy the above-described requirements, it is possible to prevent or at least minimize ghost images.

According to the present invention, there may be provided the optical device for augmented reality capable of preventing ghost images by adjusting the distance and inclination angle between the image output unit and the optical means.

While the embodiments of the present invention have been described above, the present invention is not limited to the above embodiments. It is obvious that various modifications and alterations may be possible within the scope of the present invention determined by the appended claims and drawings.

What is claimed is:

1. An optical device for augmented reality having a ghost image prevention function, the optical device comprising:
an image output unit configured to output virtual image light;
an optical means configured such that the virtual image light output from the image output unit propagates through an inside thereof and real object image light is transmitted therethrough toward a pupil of an eye of a user;
a first optical element disposed inside the optical means, and configured to transfer the virtual image light, output and transferred from the image output unit, to a plurality of second optical elements; and
the plurality of second optical elements disposed inside the optical means, and configured to provide a virtual image to the user by transferring the virtual image light, transferred from the first optical element, toward the pupil of the eye of the user;
wherein the optical means has a first surface through which the virtual image light and the real object image light are output toward the pupil of the user, a second surface which is opposite to the first surface and on which the real object image light is incident, and a third surface on which the virtual image light output from the image output unit is incident;
wherein the third surface is formed to have an inclination angle $\theta_{in}$ with respect to a normal line in a forward direction from the pupil;
wherein the third surface is disposed to face a surface of the image output unit; and
wherein the image output unit is spaced apart from the third surface so that a distance $L_g$ between the image output unit and the third surface satisfies the following equation:

$$L_g \ge \frac{L_d}{2}\sqrt{\frac{1 - n^2\sin^2\theta_{in}}{n^2\sin^2\theta_{in}}}$$

where $L_d$ is a length of the image output unit, $\theta_{in}$ is an inclination angle between the third surface of the optical means and the normal line in the forward direction from the pupil, and n is a refractive index of the optical means.

2. The optical device of claim 1, wherein the inclination angle $\theta_{in}$ between the third surface of the optical means and the normal line in the forward direction from the pupil has a value in a range of 30° to 60°.

3. The optical device of claim 1, wherein the third surface of the optical means and the surface of the image output unit are disposed parallel to each other.

4. The optical device of claim 1, wherein the virtual image light output from the image output unit is reflected by total internal reflection on the second surface of the optical means and then transferred to the first optical element, and the virtual image light output from the first optical element is reflected again by total internal reflection on the second surface of the optical means and then transferred to the second optical elements.

5. The optical device of claim 1, wherein the first optical element is any one of a reflective means configured to reflect the incident virtual image light and a half mirror configured to transmit part of the incident virtual image light therethrough and reflect part of the incident virtual image light.

6. The optical device of claim 5, wherein the first optical element is embedded inside the optical means so that a reflective surface of the first optical element faces the second surface of the optical means.

7. The optical device of claim 6, wherein the reflective surface is a curved surface that is concavely formed with respect to a direction of the second surface of the optical means.

8. The optical device of claim 1, wherein the plurality of second optical elements are arranged such that each center of the plurality of second optical elements are located along a straight line perpendicular to the normal line in the forward direction from the pupil when viewed from a side.

9. The optical device of claim 1, wherein the plurality of second optical elements are arranged spaced apart from each other to appear like a two-dimensional array when viewed from a front.

10. The optical device of claim 1, wherein the plurality of second optical elements are arranged inclined inside the optical means to transfer the virtual image light, transferred from the first optical element, to the pupil.

11. The optical device of claim 1, wherein each of the plurality of second optical elements is any one of a reflective means configured to reflect the incident virtual image light and a half mirror configured to transmit part of the incident virtual image light therethrough and reflect part of the incident virtual image light.

12. The optical device of claim 1, wherein the plurality of second optical elements are each formed of any one of a refractive element, a diffractive element, and a holographic optical element, or a combination thereof.

13. The optical device of claim 1, wherein the plurality of second optical elements have a size in a range of 0.3 to 4 mm.

* * * * *